United States Patent
Hepper et al.

(10) Patent No.: US 6,647,537 B1
(45) Date of Patent: Nov. 11, 2003

(54) IEEE 1394 CABLE CONNECTOR WITH SHORT CIRCUIT SWITCH

(75) Inventors: Dietmar Hepper, Hannover (DE); Uwe Riemann, Braunschweig (DE); Dieter Haupt, Springe (DE); Jens Cahnbley, Princeton Jct., NJ (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/980,353

(22) PCT Filed: May 23, 2000

(86) PCT No.: PCT/EP00/04693

§ 371 (c)(1),
(2), (4) Date: Nov. 29, 2001

(87) PCT Pub. No.: WO00/76253

PCT Pub. Date: Dec. 14, 2000

(30) Foreign Application Priority Data

Jun. 3, 1999  (EP) .............................................. 99110705

(51) Int. Cl.[7] ......................... G06F 17/50; G06F 13/14; H01R 13/703; H01R 33/96
(52) U.S. Cl. ........................... 716/1; 439/620; 710/305; 710/104
(58) Field of Search ....................... 716/14, 1; 439/620; 710/305, 104

(56) References Cited

U.S. PATENT DOCUMENTS

| | | | | |
|---|---|---|---|---|
| 4,819,225 A | * | 4/1989 | Hochstein | 370/216 |
| 5,379,292 A | * | 1/1995 | Kurata et al. | 370/216 |
| 5,526,217 A | | 6/1996 | Gormley et al. | 361/119 |
| 5,758,101 A | * | 5/1998 | Pemberton | 710/302 |
| 5,808,371 A | * | 9/1998 | Kon'i et al. | 307/10.1 |
| 5,883,892 A | * | 3/1999 | Taniguchi | 370/368 |
| 5,984,731 A | * | 11/1999 | Laity | 439/676 |
| 6,073,193 A | * | 6/2000 | Yap | 710/100 |
| 6,116,962 A | * | 9/2000 | Laity | 439/676 |
| 6,183,307 B1 | * | 2/2001 | Laity et al. | 439/676 |
| 6,393,509 B2 | * | 5/2002 | Yamada et al. | 710/300 |

FOREIGN PATENT DOCUMENTS

| | | | | |
|---|---|---|---|---|
| EP | 340292 B1 | * | 1/1994 | H02J/1/10 |
| JP | 07031056 A | * | 1/1995 | H02J/1/00 |
| WO | 98/33189 | | 7/1998 | |

OTHER PUBLICATIONS

Nazarov, V V (Russian Patent Document No. RU 2005306 C1, Dec. 30, 1993, 3 pages).*
NN94048241, "Soft–Stop Circuit Permits Hot–Unplugging of Boards", IBM Technical Disclosure Bulletin, vol. 37, No. 8, Aug. 1994, pp. 241–241 (4 pages).*
Translation into English of previously submitted reference in German (IDS of Nov. 29, 2001), "IEEE 1394 Das tor Zu Multimedia" radio Fernsehen Elektronik, vol. 46 No. 9, Sep. 1, 1997, pp, 54, 56.
Copy of search Report dated Sep. 15, 2000.
D. Moore IEEE 1394: "The Cable Connection to Complete the Digita Revolution Impact–IEEE 1394" "Online", Nov. 10, 1996 Retrieved from the Internet.
A. Paskins "The IEEE 1394 BUS" IEE Half–Day Colloquium on New High Capacity Digital Media and Their Applications, May 12, 1997, pp. 4/1–4/06.

* cited by examiner

*Primary Examiner*—Matthew Smith
*Assistant Examiner*—Phallaka Kik
(74) *Attorney, Agent, or Firm*—Joseph S. Tripoli; Paul P. Kiel

(57) ABSTRACT

In case of a loss of power supply a short-circuit between the corresponding pins of the two IEEE 1394 connectors of a device is established. Preferably this will be achieved by a relay controlling switches. If power is available, the relay is powered and the switches are open. The device then behaves like without this extension. If power is lost, the relay is not powered any longer, and the switches are closed. By this way, the device simply disappears from the cluster, which will then be reorganised according to IEEE 1394 rules.

Figure 1B:
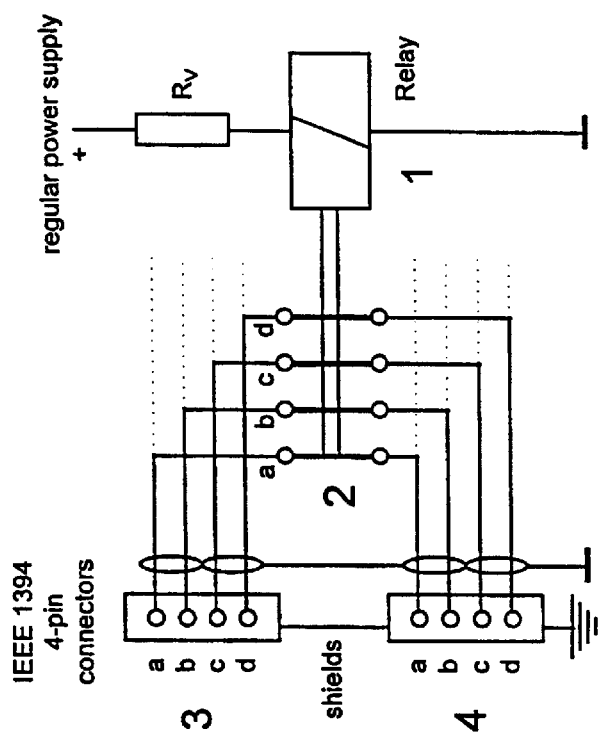

3 Claims, 1 Drawing Sheet b) Power-lost case b) Power-lost case a) Power-available case

IEEE 1394 CABLE CONNECTOR WITH SHORT CIRCUIT SWITCH

This application claims the benefit, under 35 U.S.C. §365 of International Application PCT/EP00/04693, filed May 23, 2000, which was published in accordance with PCT Article 21(2) on Dec. 14, 2000 in English and which claims the benefit of European patent application No. 99110705.3 filed Jun. 3, 1999.

The invention relates to an IEEE 1394 cable connector.

BACKGROUND

The IEEE 1394 standard describes a high speed, low cost Serial Bus suitable for use as a peripheral bus or a backup to parallel back-plane buses. Highlights of the Serial Bus include:

a) Automatic assignment of node addresses—no need for address switches.
b) Variable speed data transmission based on ISDN-compatible 1 bit rates from 24.576 Mbit/s for TTL backplanes to 49.152 Mbit/s for BTL backplanes to 98.304, 196.608, and 393.216 Mbit/s for the cable medium.
c) The cable medium allows up to 16 physical connections (cable hops) each of up to 4.5 meters, giving a total cable distance of 72 meters between any two devices. Bus management recognises smaller configurations to optimise performance.
d) Bus transactions that include both block and single quadlet reads and writes, as well as an "isochronous" mode which provides a low-overhead guaranteed bandwidth service.
e) A physical layer (PHY) supporting both cable media and backplane busses.
f) A fair bus access mechanism that guarantees all nodes equal access. The backplane environment adds a priority mechanism, but one that ensures that nodes using the fair protocol are still guaranteed at least partial access.

An IEEE 1394 4-pin cable connects a pair of devices, a further device can be added by another cable attached to one of the former two, etc.—thus establishing a cluster or chain of devices. This chain contains devices which have two neighbouring devices attached to them, as well as devices at the end of the chain with only one neighbour. Each device has a mains connection, and when the device is switched off and goes into a stand-by mode, its IEEE 1394 physical layer implementation is still powered to provide certain functionality. If for example the home user disconnects the power plug of one device in a chain—e.g., the TV set—this stand-by function will be lost. As a consequence, the PHY layer functionality is lost and the chain is broken—leaving two separate smaller clusters of devices.

In order to avoid a break of the chain in case of internal power supply failure a solution is described in the IEEE 1394 standard, using a power storage device to provide power to the devices, while these devices are gracefully shutting down after the internal power supply fails. Normally the internal power supply provides power for the PHY and the power storage device. If the internal power supply fails a power fail sense line signals the logic that a failure has occurred and the load switches over to the power storage device.

INVENTION

It is an object of the present invention to disclose an IEEE 1394 cable connector, that allows bus connections to all available devices linked to the bus in case of power failure of one device.

According to the invention, this object is achieved by means of the features specified in main claims. Advantageous designs and developments are specified in subclaims.

In case of a loss of power supply a short-circuit between the corresponding pins of the two IEEE 1394 connectors of a device is established. Preferably this will be achieved by a relay controlling switches. If power is available, the relay is powered and the switches are open. The device then behaves like without this extension. If power is lost, the relay is not powered any longer, and the switches are closed. By this way, the device simply disappears from the cluster, which will then be reorganised according to IEEE 1394 rules.

DRAWINGS

Figure 1A:
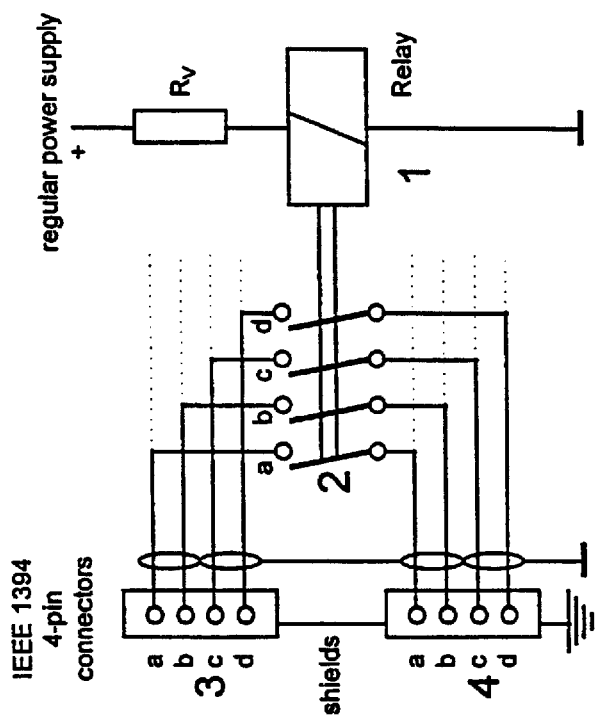

Embodiments of the invention are described with reference to the accompanying drawing, which shows in:

FIG. 1a Bus connection implementation in power available case;

FIG. 1b Bus connection implementation in power lost case;

EXEMPLARY EMBODIMENTS

Exemplary embodiments of the invention are explained in more detail in the following description.

FIG. 1 shows an example of a bus connection implementation in power available case. A relay 1 controlling four switches 2 with contacts a, b, c, d is connected with the regular power supply already available in the respective device via a resistor $R_v$. All switches 2 are connected with the 4 respective pins of the two IEEE 1394 connectors 3, 4 available in the device in the way shown in FIG. 1a. FIG. 1a shows the switch position of the relay 1 in the case of power being available to the device. In this case there is no short-circuit established between corresponding pins of the two IEEE 1394 connectors.

FIG. 1b shows the case where the mains connection of the device has been lost and power is not available. The relay 1 turns into its resting position closing the contacts a, b, c, d of the four switches 2. In this position the 4 respective pins of the two IEEE 1394 connectors 3, 4 are connected. By this way, the two IEEE 1394 cables attached to the device at these connectors 3, 4 are transformed into a new, longer cable. The powerless device disappears from the cluster it has formed part of before. The cluster will now be reorganized with one device less, and will stay operational.

If a device equipped with the invention is disconnected from the mains, e.g. a TV set, the cluster it has formed part of will still be operational.

Since the two cables attached to the device form one new longer cable now, the "new" cable should not exceed the longest cable length that still allows IEEE 1394 operation in the given situation. The invention helps in all cases where this length is not exceeded. Without the invention, the cluster would be broken at the point of the disconnected device.

Instead of a relay with switches also electronic switches can be used.

What is claimed is:

1. Device having a power supply and at least two IEEE 1394 cable connectors with pins for data lines or data lines and additional power supply lines, wherein, short-circuit switches are provided that are adapted to connect together the data line pins of one cable connector with corresponding data line pins of the other cable connector via short-circuit switches, the device comprising means for opening the short-circuit switches in case the device is powered by means of the power supply, and for closing the short-circuit switches in case the power supply stops providing power to the device, thereby maintaining data throughput from one cable connector to the other cable connector in case of a power loss.

2. Device according to claim 1, wherein the short-circuit switches are part of a relay.

3. Device according to claim 1, wherein the short-circuit switches are designed as electronic switches.

* * * * *